US012546459B2

(12) United States Patent
Pyo

(10) Patent No.: US 12,546,459 B2
(45) Date of Patent: *Feb. 10, 2026

(54) VEHICLE LIGHTING DEVICE

(71) Applicant: HYUNDAI MOBIS CO., LTD., Seoul (KR)

(72) Inventor: Kyung Min Pyo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/053,905

(22) Filed: Feb. 14, 2025

(65) Prior Publication Data
US 2025/0189103 A1 Jun. 12, 2025

Related U.S. Application Data

(63) Continuation of application No. 18/793,018, filed on Aug. 2, 2024, now Pat. No. 12,253,238.

(30) Foreign Application Priority Data

Oct. 24, 2023 (KR) .................. 10-2023-0142844

(51) Int. Cl.
*F21V 14/04* (2006.01)
*B60Q 3/80* (2017.01)
*F21V 7/24* (2018.01)
*F21V 13/10* (2006.01)
*F21Y 115/10* (2016.01)

(52) U.S. Cl.
CPC ............... *F21V 14/04* (2013.01); *B60Q 3/80* (2017.02); *F21V 7/24* (2018.02); *F21V 13/10* (2013.01); *F21Y 2115/10* (2016.08)

(58) Field of Classification Search
CPC ....... B60Q 3/80; F21V 7/22–24; F21V 13/10; F21V 14/04; F21Y 2115/10
See application file for complete search history.

(56) References Cited

U.S. PATENT DOCUMENTS 10,443,808 B1    10/2019  Heib et al.
2020/0158307 A1*  5/2020  Kanamori ............. F21S 41/675

* cited by examiner

*Primary Examiner* — Jason M Han
(74) *Attorney, Agent, or Firm* — MORGAN, LEWIS & BOCKIUS LLP

(57) ABSTRACT

A vehicle lighting device according to an embodiment may include a housing mounted inside a vehicle, a light source part, and an aluminum film part of which a shape changes according to an operation of the light source part.

10 Claims, 5 Drawing Sheets

[FIG. 1]
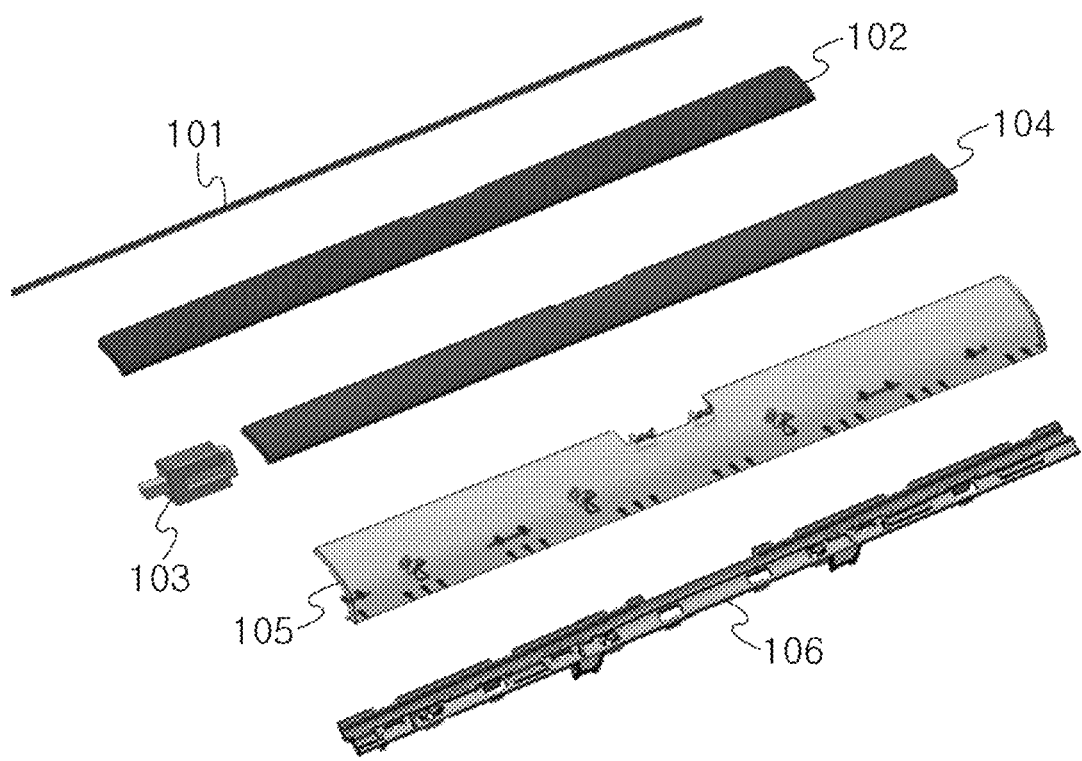

[FIG. 2A]
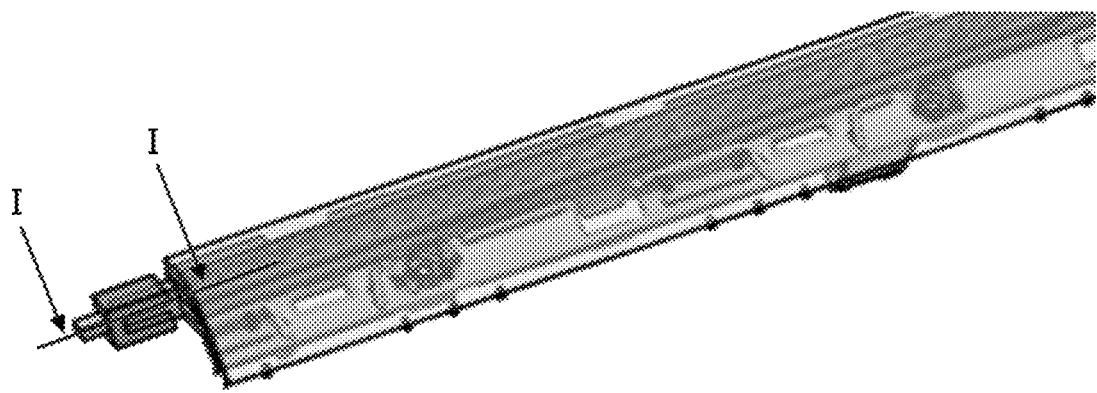
[FIG. 2B]
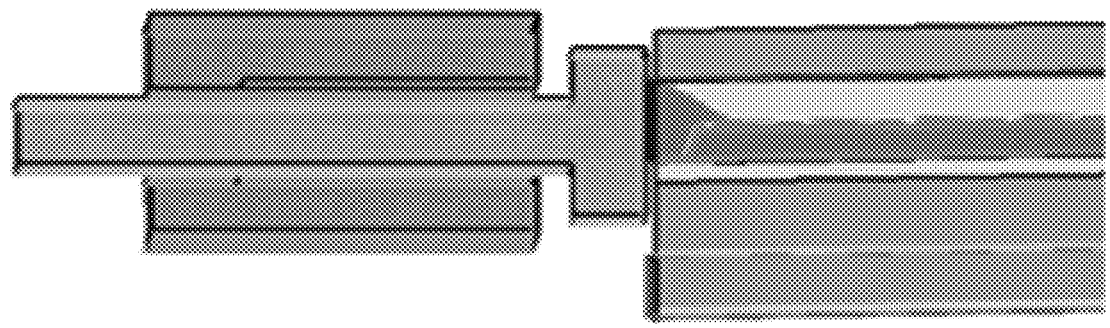
[FIG. 2C]
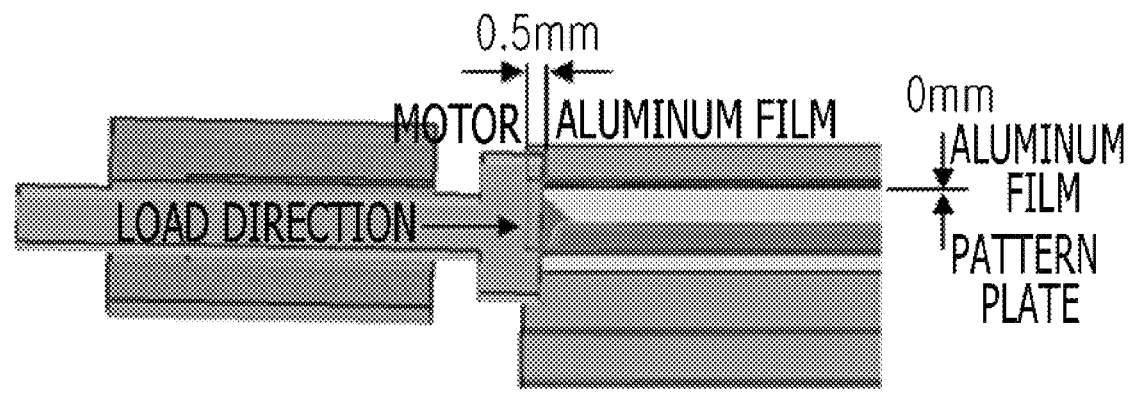

[FIG. 2D]
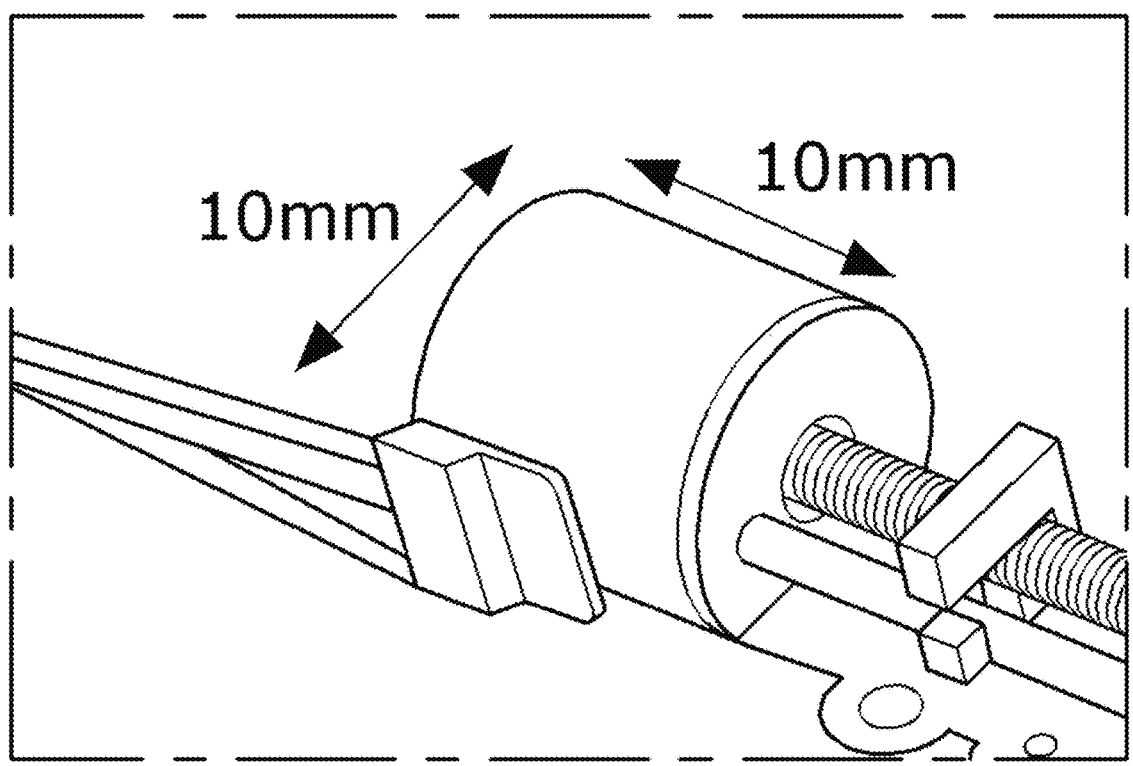

[FIG. 3A]
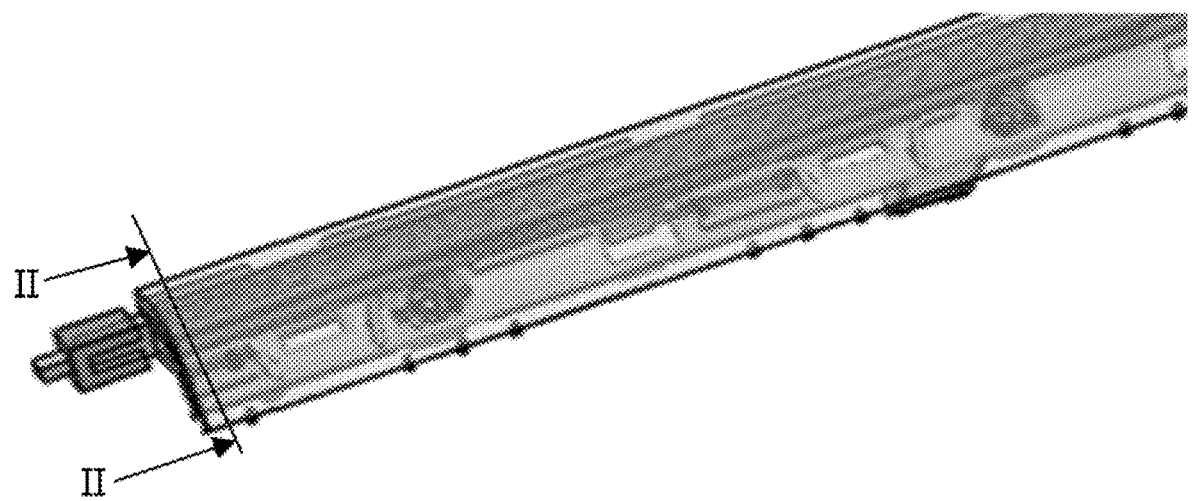
[FIG. 3B]
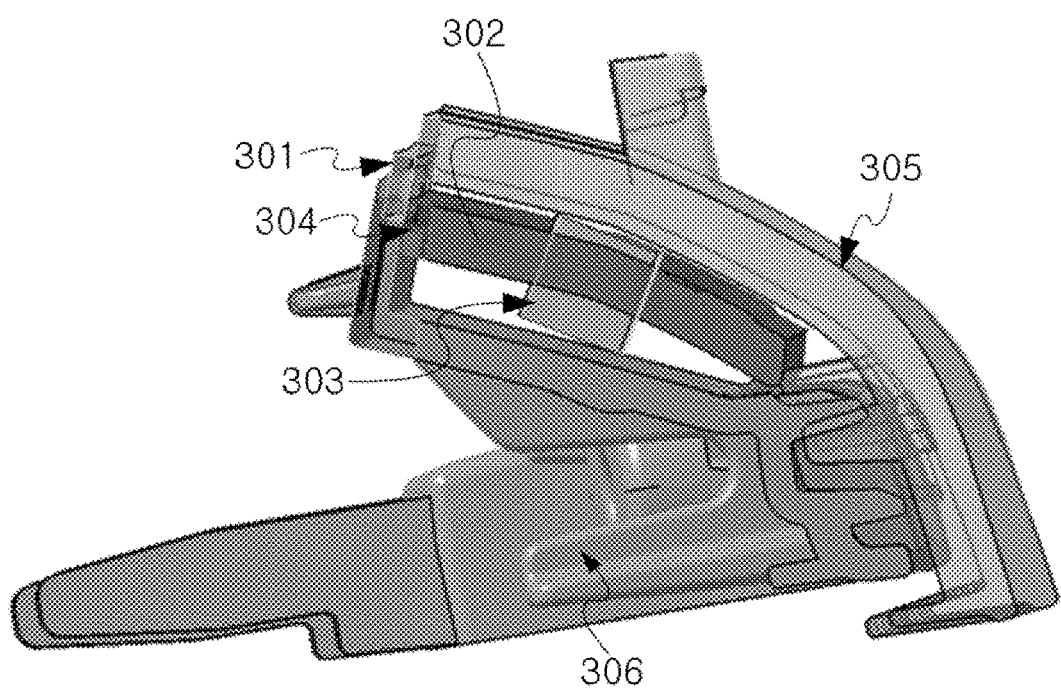

[FIG. 4A]
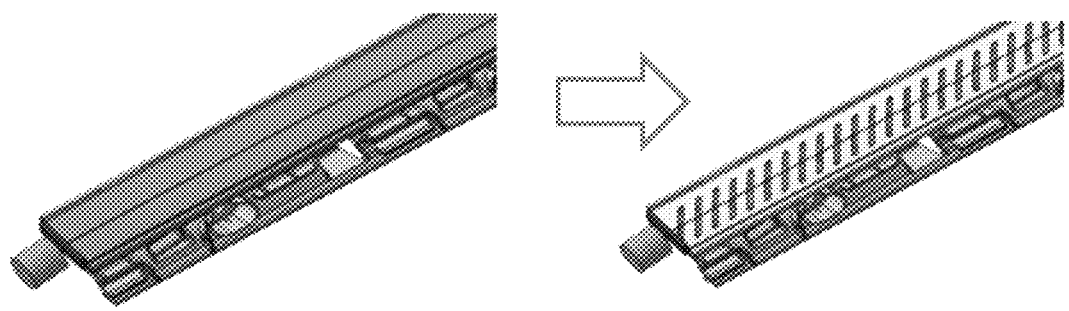
[FIG. 4B]
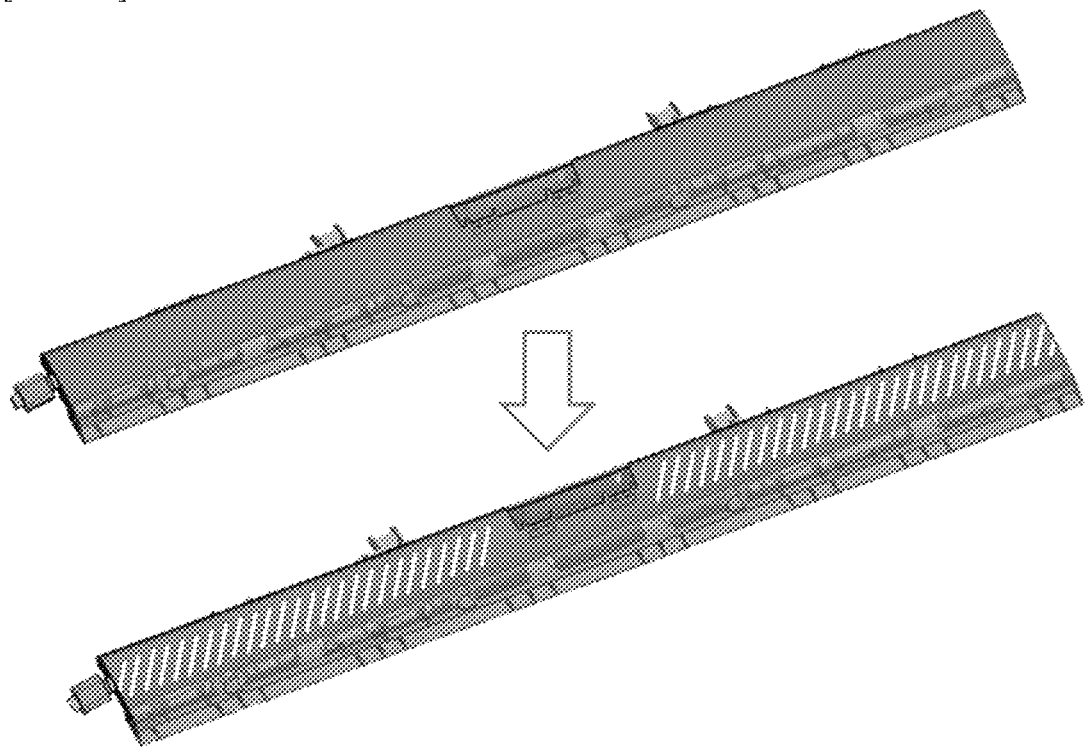

VEHICLE LIGHTING DEVICE

CROSS-REFERENCE TO RELATED APPLICATION

This application is the continuation application of U.S. patent application Ser. No. 18/793,018 filed Aug. 2, 2024, which claims priority from and the benefit of Korean Patent Application No. 10-2023-0142844, filed on Oct. 24, 2023, both of which are incorporated herein by reference for all purposes.

BACKGROUND

1. Field

An embodiment of the present invention relates to a vehicle lighting device, and more particularly, to a three-dimensional (3D) variable pattern structure for a mood lamp using a crush metric mechanism.

2. Description of Related Art

Vehicles may include lamps including lighting lamps for easily identifying objects positioned around the vehicles while traveling, lighting lamps for safety of other vehicles or people, or the like.

In recent years, the number of vehicles having various lighting lamps applied to an interior of the vehicles is increasing, and accordingly, many problems for application of the lighting lamps are occurring.

Although much research is being conducted to solve these problems, there are still various unsolved problems.

SUMMARY

One aspect of the present invention provides a vehicle lighting device including a housing mounted inside a vehicle, a light source part, and an aluminum film part of which a shape changes according to an operation of the light source part.

The vehicle lighting device may further include a motor part that applies a load to the aluminum film part, wherein a shape of the aluminum film part may be deformed or restored according to the load applied by the motor part.

When the load is applied by the motor part, at least a portion of the aluminum film unit may form a repeated pattern.

The motor part may automatically apply a load in a preset range to the aluminum film part according to turning-on of a controller or the light source part.

When the load is not applied by the motor part, the formed pattern may be removed, and the aluminum film part may be restored to an original shape before formation of the pattern.

The motor part may automatically remove the load applied to the aluminum film part according to turning-off of a controller or the light source part.

The light source part may be provided with a light emitting diode (LED), and the aluminum film part may include an aluminum film containing at least an aluminum material.

The vehicle lighting device may further include a pattern plate through which a light emitted from the light source part or a light reflected by the aluminum film part passes.

At least a portion of the pattern plate may be disposed close to the aluminum film part.

The vehicle lighting device may further include an outer cover disposed close to an outside of at least some of the housing, the light source part, and the aluminum film part.

BRIEF DESCRIPTION OF THE DRAWINGS

FIG. 1 is a view illustrating a configuration of a vehicle lighting device according to an embodiment.

FIGS. 2A-2D are a view illustrating a vertical load being applied to the vehicle lighting device according to the embodiment.

FIGS. 3A and 3B are a view illustrating the vehicle lighting device according to the embodiment.

FIGS. 4A and 4B are a view illustrating a pattern change of the vehicle lighting device according to the embodiment.

DETAILED DESCRIPTION

Hereinafter, embodiments of the present invention will be described in detail with reference to the accompanying drawings.

However, the technical spirit of the present invention is not limited to some embodiments to be described and may be implemented in various different forms, and one or more components may be selectively combined or substituted between the embodiments within the scope of the technical spirit of the present invention.

Further, unless explicitly defined and described, terms (including technical and scientific terms) used in the embodiments of the present invention may be interpreted in a meaning that may be generally understood by those skilled in the art to which the present invention pertains. Terms generally used, such as terms defined in the dictionary, may be interpreted in consideration of the meaning of the context of the related technology.

Further, terms used in the embodiments of the present invention are for describing the embodiments and are not intended to limit the present invention.

In the present specification, a singular form may include a plural form unless specifically mentioned in a phrase, and when "at least one (or one or more) of A, B, and C" is described, one or more of all combinations that may be combined with A, B, and C may be included.

Further, in the description of the components of the embodiments of the present invention, terms such as first, second, A, B, (a), and (b) may be used.

These terms are not used to delimit an essence, an order or sequence, and the like of a corresponding component but used merely to distinguish the corresponding component from other component(s).

Further, when it is described that a first component is "connected" or "coupled" to a second component, the first component may be "connected" or "coupled" to the second component with a third component therebetween as well as the first component may be directly connected or coupled to the second component.

Further, when it is described that a first component is formed or disposed "above" or "below" a second component, the terms "above" and "below" include that one or more third components may be formed or arranged between the first and second components as well as the first and second components may be in direct contact with each other. Further, when the "above or below" is expressed, the "above or below" may include the meanings of a downward direction as well as an upward direction based on one component.

Hereinafter, embodiments will be described in detail with reference to the accompanying drawings, the same or corresponding components are designated by the same reference numerals regardless of the reference numerals, and the duplicated description thereof will be omitted.

FIG. 1 is a view illustrating a configuration of a vehicle lighting device according to an embodiment.

Referring to FIG. 1, main components of the vehicle lighting device may be identified.

According to an embodiment, the vehicle lighting device may include a housing 106 mounted inside a vehicle, a light source part 101, an aluminum film part 104 of which a shape changes according to an operation of the light source part 101, and a motor part 103 that applies a load to the aluminum film part 104.

A shape of the aluminum film part 104 may be deformed or restored depending on a load applied by the motor part 103. The housing 106 may include a mood lamp housing.

The motor part 103 may be automatically driven by a motor.

Components of the vehicle lighting device may include at least some of a vehicle, a lighting device, a motor, a machine, a circuit, a semiconductor, a computing device, a memory, a processor, a data transceiver, and the like, and at least some of the components may be mechanically/physically/communicatively/electrically connected to at least some of the other components.

Each of the components of the vehicle lighting device may be disposed close to at least some of the other components of the vehicle lighting device. Each of the components of the vehicle lighting device may include or be provided with at least some materials among plastic, glass, and a metal.

According to the embodiment, the aluminum film part 104 may form a pattern of which at least a portion is repeated when a load is applied by the motor part 103.

According to the embodiment, the motor part 103 may automatically apply a load in a preset range to the aluminum film part 104 when a controller or the light source part 101 is turned on.

The controller may include a control device or controller connected to the vehicle lighting device or the vehicle, and the vehicle lighting device may further include a controller (not illustrated). The controller may further include a light source controller that controls the light source part 101 and a motor controller that controls the motor part 103.

The light source part 101 and the motor part 103 may be connected through a circuit or the like and connected/constructed/set so that, when a current/voltage or the like is provided to the light source part 101, the current/voltage may be also provided to the motor part 103. The light source part 101 and the motor part 103 may be implemented to operate simultaneously in some cases and may be implemented to operate at different time points in some cases.

The light source controller may receive an input for turning-on/off of the light source/light source part from a user/driver/passenger of the vehicle. The light source controller may receive a signal generated from a button or the like mounted on the vehicle. The light source controller may control the light source/light source part such that the light source/light source part is turned on/off according to the input received from the user.

The motor controller may receive an input for turning-on/off of the motor part 103 from the user/driver/passenger of the vehicle. The motor controller may receive a signal generated from the button or the like mounted on the vehicle. The motor controller may control the motor part 103 so that the motor part 103 is turned on/off according to the input received from the user or an input received from the light source controller. The motor controller may control the number of rotations and rotation speed of the motor, rotation/movement speeds of at least some of a piston, a rotor, and a structure attached to the rotor, movement distances of at least some of the piston, the rotor, and the structure attached to the rotor, and the like.

The motor controller may control a position, a movement angle, and the like of at least a portion of the motor part 103. The motor controller may control a direction, a magnitude, a distance, a speed and the like of a load applied to the aluminum film part 104 by the at least a portion of the motor part 103. The motor controller may control the direction, the magnitude, the distance, the speed and the like of a load applied to the aluminum film part 104 by the at least a portion of the motor part 103 randomly or according to setting/input of the user.

The motor part 103 may operate as a film loading mechanism part. The motor part 103 may include a micro motor. The motor part 103 may include at least some of the rotor, a stator, the piston and the like. At least some of the piston, the rotor, and the structure attached to the rotor of the motor part 103 may apply a load to the aluminum film part 104.

The motor part 103 may include a structure attached to the rotor, such as a disc and a quadrangular plate, and may include a protrusion structure that protrudes outward together with the piston, a screw shape, a nut, a bolt, and the like.

According to the embodiment, when a load is not applied by the motor part 103, the formed pattern is removed, and thus the aluminum film part 104 may be restored to an original shape before formation of the pattern.

According to the embodiment, the motor part 103 may automatically remove a load applied to the aluminum film part 104 according to turning-off of the controller or the light source part 101.

According to the embodiment, the light source part 101 may include a light emitting diode (LED), and the aluminum film part 104 may include an aluminum film containing at least an aluminum material.

According to the embodiment, the vehicle lighting device may further include a pattern plate 102 through which a light emitted from the light source part 101 or a light reflected by the aluminum film part 104 passes.

According to the embodiment, at least a portion of the pattern plate 102 may be disposed close to the aluminum film part 104.

According to one embodiment, the vehicle lighting device may further include an outer cover 105 disposed close to the outside of at least some of the housing 106, the light source part 101, and the aluminum film part 104. The outer cover 105 may include a mood lamp outer cover.

FIGS. 2A-2D are a view illustrating a vertical load being applied to the vehicle lighting device according to the embodiment.

Referring to FIG. 2A, it can be seen that, when a vertical load equal to 0.5 mm is applied to the aluminum film part by the motor part such as a micro motor, a shape of an inner pattern plate is transferred, and when the vertical load is not applied, the shape is restored due to elasticity that is smaller than or equal to a threshold point, and thus there is no pattern. Arrows I of FIG. 2A indicate the direction in which the section shown in FIG. 2B is taken and viewed.

The aluminum film part may be attached to or in contact with the pattern plate without an adhesive through a surface touch.

Referring to FIG. 2B, it can be seen that the motor part does not apply the vertical load to the aluminum film part.

Referring to FIG. 2C, it can be seen that a current is applied to the motor part, the vertical load having 0.5 mm (or less than 0.5 mm) is applied only to the aluminum film part, and the pattern is transferred to the aluminum film from an interior of a film of the aluminum film part depending on a shape/form of the pattern plate. A lower pattern plate may only serve as a light guide plate. The pattern plate may include at least a portion of the light guide plate.

Referring to FIG. 2D, motor specifications of the motor part may be identified. The motor part may be a micro motor such as a Micro Stepper Motor, and the size may be 10 mm×10 mm (or about 10 mm×10 mm or smaller).

FIGS. 3A and 3B are a view illustrating the vehicle lighting device according to the embodiment.

Referring to FIG. 3B, a product cross section of the vehicle lighting device may be identified.

Referring to FIG. 3A, it can be seen that the motor part applies a load to the aluminum film part. Arrows II of FIG. 3A indicate the direction in which the section shown in FIG. 3B is taken and viewed.

The vehicle lighting device may be mounted inside the vehicle and include a light source part 301 such as an LED, a pattern plate 302, a motor part 303 as a load mechanism part, an aluminum film part 304 such as an aluminum film, an outer cover 305 such as the mood lamp outer cover, and a housing 306 such as the mood lamp housing.

The aluminum film part 304 may be surface-attached to the pattern plate 302.

A light emitted from the light source part 301 may reach the pattern plate 302, the aluminum film part 304, or the like or may be reflected/absorbed/blocked by the pattern plate 302, the aluminum film part 304, or the like.

A light passing through the pattern plate 302 or the like or reflected by the aluminum film part 304 or the like may pass through the outer cover 305 of the like.

At least some of the light source part 301, the pattern plate 302, the aluminum film part 304, and the outer cover 305 may be mounted/disposed on the housing 306. At least some of the light source part 301, the pattern plate 302, the aluminum film part 304, and the outer cover 305 may include a fastening structure/detachment structure so that the at least some of the light source part 301, the pattern plate 302, the aluminum film part 304 are mounted/arranged on the housing 306.

The light source part 301 may be disposed close to at least a portion of the pattern plate 302 or the aluminum film part 304. The outer cover 305 may be disposed to surround at least a portion of an outside/periphery of the pattern plate 302 or the aluminum film part 304.

A shape of the aluminum film part 304 may be restored only by elasticity of the aluminum film after a load is applied, and in the film specifications of the aluminum film part 304, a thickness thereof may be 0.1 mm or less, and a minimum elasticity value may be 10 KN or more.

FIGS. 4A and 4B are a view illustrating a pattern change of the vehicle lighting device according to the embodiment.

Referring to FIGS. 4A and 4B, it can be seen that a pattern of the vehicle lighting device is formed.

Referring to FIG. 4A, it can be seen that, when at least a portion of the motor part vertically presses at least a portion of the aluminum film part, the aluminum film part may be folded in a repeated pattern.

This folded pattern is determined by a pattern inside the film and folded until a threshold value is exceeded, and the other side thereof is folded when the threshold value is reached. The aluminum film part may have a repeated pattern depending on whether a load is applied.

The vehicle lighting device may be configured to not exceed an elastic deformation point of the film itself of the aluminum film part and thus may operate without permanent changes (wrinkles).

Referring to FIG. 4B, it can be seen that, when the aluminum film part is vertically pressed, the aluminum film part is folded in the same pattern until a vertical load reaches the threshold value.

The vehicle lighting device may implement a variable three-dimensional (3D) mood lamp pattern through a crush matrix structure and provide a repeated pattern by applying a load to not exceed an elastic deformation threshold value of the aluminum film itself of the aluminum film part.

In the vehicle lighting device, various pattens are implemented so that the patterns are different whenever the vehicle lighting device operates, a pattern structure inside a mood lamp satisfies aesthetic sensibility of the pattern when a light is emitted, and thus emotional quality of vehicle users is satisfied. The pattern of the vehicle lighting device may be uniform or may be randomly changed into various patterns according to user settings.

The term "~unit" used in the present embodiment refers to software or hardware components such as a field-programmable gate array (FPGA) or an application specific integrated circuit (ASIC), and "~unit" performs certain roles. However, "~unit" is not limited to the software or the hardware. "~unit" may be present in an addressable storage medium or may refresh one or more processors. Thus, as an example, "~unit" includes components such as software components, object-oriented software components, class components, and task components and may include processes, functions, properties, procedures, sub-routines, segments of a program code, drivers, firmware, microcode, circuits, data, database, data structures, tables, arrays, and variables. Functions provided in the components and "~unit" may be combined into a smaller number of components and "~units" or may be further divided into additional components and "~units." In addition, the components and "~units" may be implemented to reproduce one or more central processing units (CPUs) in a device or a security multimedia card.

Although the exemplary embodiments of the present invention have been described above, those skilled in the art may understand that the present invention may be variously modified and changed without departing from the spirit and scope of the present invention described in the appended claims.

What is claimed:

1. A vehicle lighting device comprising:
   a light source part;
   a motor part connected to the light source part; and
   an aluminum film part of which a shape changes according to a load applied by the motor part.

2. The vehicle lighting device of claim 1, wherein a shape of the aluminum film part is deformed or restored according to the load applied by the motor part.

3. The vehicle lighting device of claim 2, wherein, when the load is applied by the motor part, at least a portion of the aluminum film unit forms a repeated pattern.

4. The vehicle lighting device of claim 2, wherein the motor part automatically applies a load in a preset range to the aluminum film part according to turning-on of a controller or the light source part.

5. The vehicle lighting device of claim 3, wherein, when the load is not applied by the motor part, the formed pattern is removed, and the aluminum film part is restored to an original shape before formation of the pattern.

6. The vehicle lighting device of claim 2, wherein the motor part automatically removes the load applied to the aluminum film part according to turning-off of a controller or the light source part.

7. The vehicle lighting device of claim 1, wherein the light source part is provided with a light emitting diode (LED), and the aluminum film part includes an aluminum film containing at least an aluminum material.

8. The vehicle lighting device of claim 1, further comprising: a pattern plate through which a light emitted from the light source part or a light reflected by the aluminum film part passes.

9. The vehicle lighting device of claim 8, wherein at least a portion of the pattern plate is disposed close to the aluminum film part.

10. The vehicle lighting device of claim 1, further comprising: an outer cover disposed close to an outside of one or more of a housing, the light source part, and the aluminum film part.

\* \* \* \* \*